(12) United States Patent
Abraham et al.

(10) Patent No.: US 10,387,393 B1
(45) Date of Patent: Aug. 20, 2019

(54) SYSTEM, METHOD, AND COMPUTER PROGRAM FOR GENERATING A MATURITY ASSESSMENT OF A DOCUMENT MANAGEMENT SYSTEM

(71) Applicant: Amdocs Development Limited, Limassol (CY)

(72) Inventors: Golan Abraham, Tel-Mond (IL); David Haim Santar, Modiin (IL); Amir Mandl, Hadera (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 398 days.

(21) Appl. No.: 15/195,990

(22) Filed: Jun. 28, 2016

(51) Int. Cl.
*G06F 16/22* (2019.01)
*G06F 3/0484* (2013.01)
*G06F 16/28* (2019.01)

(52) U.S. Cl.
CPC .......... *G06F 16/22* (2019.01); *G06F 3/04842* (2013.01); *G06F 16/285* (2019.01)

(58) Field of Classification Search
CPC .............. G06Q 10/0639; G06Q 10/06; G06Q 10/06313; G06Q 10/0637; G06Q 10/06315; G06Q 10/06395; G06Q 30/0201; G06F 17/30528; G06F 17/3089; G06F 17/30958; G06F 16/248; G06F 16/22; G06F 16/285; G06F 16/338; G06F 3/04842
USPC ........................ 707/608; 705/7.29, 7.38, 7.41
See application file for complete search history.

(56) References Cited

U.S. PATENT DOCUMENTS

| | | | |
|---|---|---|---|
| 2004/0117234 A1 | 6/2004 | Lindsay-Scott et al. | |
| 2008/0115110 A1* | 5/2008 | Fliek | G06F 11/3672 717/125 |
| 2009/0300577 A1* | 12/2009 | Bernardini | G06Q 10/06 717/101 |
| 2015/0058095 A1* | 2/2015 | Clay | G06Q 10/06395 705/7.41 |
| 2015/0112770 A1* | 4/2015 | Phillips | G06Q 10/0639 705/7.38 |
| 2016/0117693 A1* | 4/2016 | Batra | G06Q 30/0201 705/7.29 |
| 2016/0260037 A1* | 9/2016 | Kumar | G06Q 10/0637 |
| 2017/0300843 A1* | 10/2017 | Dube | G06Q 10/06313 |

OTHER PUBLICATIONS

Pelz-Sharpe, A. et al., "ecm3-ecm maturity model," Version 1.0, Feb. 2009, pp. 1-37.

* cited by examiner

*Primary Examiner* — Dung K Chau
(74) *Attorney, Agent, or Firm* — Zilka-Kotab, P.C.

(57) ABSTRACT

A system, method, and computer program product are provided for generating a maturity assessment of a document management system. In use, a plurality of questionnaires are stored, in a database, where the questionnaires include questions relating to document management system. Further, one or more answers to one or more of the questions are received, via at least one input device. Utilizing at least one processor, the one or more of answers to the one or more of the questions are processed, for generating a maturity assessment of the document management system. To this send, information relating to the maturity assessment of the document management system is output via at least one output device.

7 Claims, 8 Drawing Sheets

SYSTEM, METHOD, AND COMPUTER PROGRAM FOR GENERATING A MATURITY ASSESSMENT OF A DOCUMENT MANAGEMENT SYSTEM

FIELD OF THE INVENTION

The present invention relates to data processing systems, and more particularly to document management systems (DMSs).

BACKGROUND

Managing a lifecycle of customer documents within telecommunication carriers is typically handled via various business channels such as points of sale (POS), self-service, various legacy systems, etc. The techniques, methods and procedures used to file the documents and later access their content may vary based on an adherence to a maturity of techniques in use. It many cases, telecommunication carriers are not aware of their actual status in this domain and, therefore, are incapable of engaging in proper discovery sessions for matching best available solutions addressing an actual maturity of relevant document management procedures and techniques. Current processes and assessments are unfortunately managed in a manual and/or qualitative manner.

There is thus a need for addressing these and/or other issues associated with the prior art.

SUMMARY

A system, method, and computer program product are provided for generating a maturity assessment of a document management system (DMS). In use, a plurality of questionnaires are stored, in a database, where the questionnaires include questions relating to the DMS. Further, one or more answers to one or more of the questions are received, via at least one input device. Utilizing at least one processor, the one or more of answers to the one or more of the questions are processed, for generating a maturity assessment of the DMS. To this send, information relating to the maturity assessment of the DMS is output via at least one output device.

DETAILED DESCRIPTION

Figure 1:
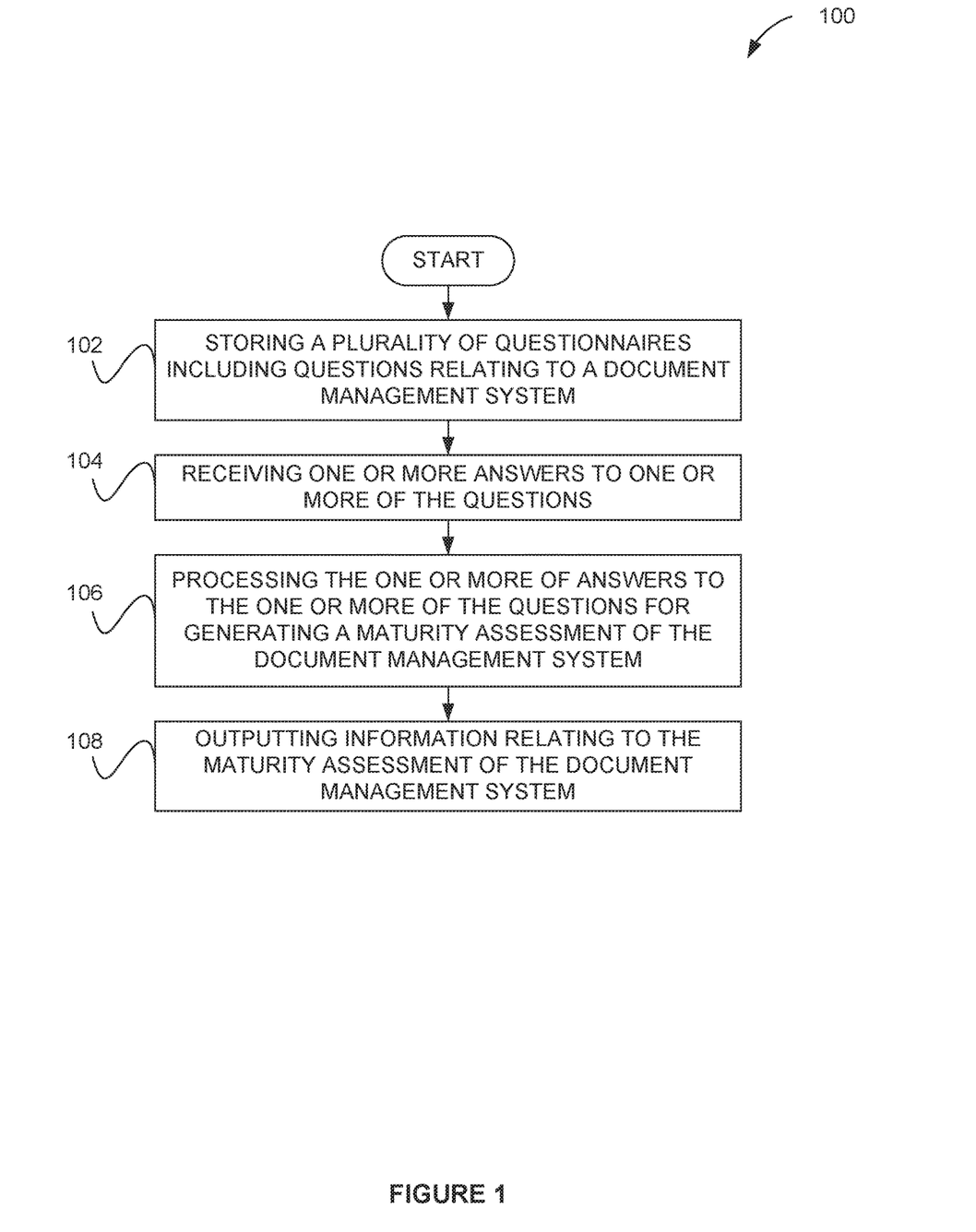
FIG. 1 illustrates a method for generating a maturity assessment of a document management system (DMS), in accordance with one embodiment.

FIG. 1 illustrates a method 100 for generating a maturity assessment of a document management system (DMS), in accordance with one embodiment. As shown, in operation 102, a plurality of questionnaires are stored which include questions relating to a DMS. In the context of the present description, such questionnaires may take any form (e.g. interview, questionnaire form, etc.) that is capable of being digitally stored and further capable of soliciting one or more answers, as will soon become apparent. Further, the DMS may include any combination of hardware and/or software that is used to manage documents which, in turn, may refer to any piece of written, printed, or electronic matter that provides information or evidence relating to an entity. It should be noted that such documents, when taking the form of telecommunication documents, may relate to any aspect of the telecommunication carrier including, but not limited to operations, customers, and/or any other aspect, for that matter.

With continuing reference to FIG. 1, one or more answers to one or more of the questions are received in operation 104. In the context of the present description, the one or more answers may refer to any user input that is capable of being received in response to a presentation of the one or more of the questions of one or more of the questionnaires. In one embodiment, the answers may be predetermined for each question for allowing a user to select the one or more answers that is received in operation 104. Still yet, each of the answers may indicate a different level of maturity relating to the DMS. In yet another embodiment, the questions may be grouped into groups such that the one or more answers and the maturity assessment relate to at least one of the groups. As an option, such groups may relate to telecommunication business channels. In the present description, such telecommunication business channels may refer to any operation, customer, and/or any other aspect of a telecommunication business.

Next, the one or more of answers to the one or more of the questions are processed for generating a maturity assessment of the DMS. See operation 106. In the context of the present description, such maturity assessment may include any assessment involving maturity which may, in turn, refer to any predetermined state of development (e.g. a level of completeness, sufficiency, etc.).

In one possible embodiment where a plurality of the answers to a plurality of the questions are received, such plurality of answers may be processed for generating a plurality of maturity assessments of the DMS. Further, such plurality of maturity assessments may each relate to a single group. In such embodiment, the plurality of maturity assessments may be aggregated, for generating a single maturity assessment.

In operation 108, information relating to the maturity assessment of the DMS is output. In the present description, the information (relating to the maturity assessment) may include the maturity assessment itself and/or any other information that is extracted and/or derived therefrom (e.g. via additional processing, etc.). For example, in one embodiment, the maturity assessment may include color coding that indicates a level of maturity relating to the DMS. In another embodiment, the maturity assessment may include predetermined text phrases that indicate a level of maturity relating to the DMS.

In another possible embodiment, the maturity assessment may be processed for generating one or more remedies. In the present description, such remedy may refer to any solution (e.g. technical or otherwise, etc.) that remedies, at least in part, any lack of maturity indicated by the maturity assessment. In another possible embodiment, information relating to the one or more remedies may be output. In the present description, the information (relating to the remedy(ies)) may include the remedy itself and/or any other information that is extracted and/or derived therefrom (e.g. via additional processing, etc.). Further, as an extension to the aforementioned grouping feature, the questions may be grouped into groups such that the one or more answers, the maturity assessment, and even the one or more remedies relate to at least one of the groups (e.g. telecommunication business channels, etc.).

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
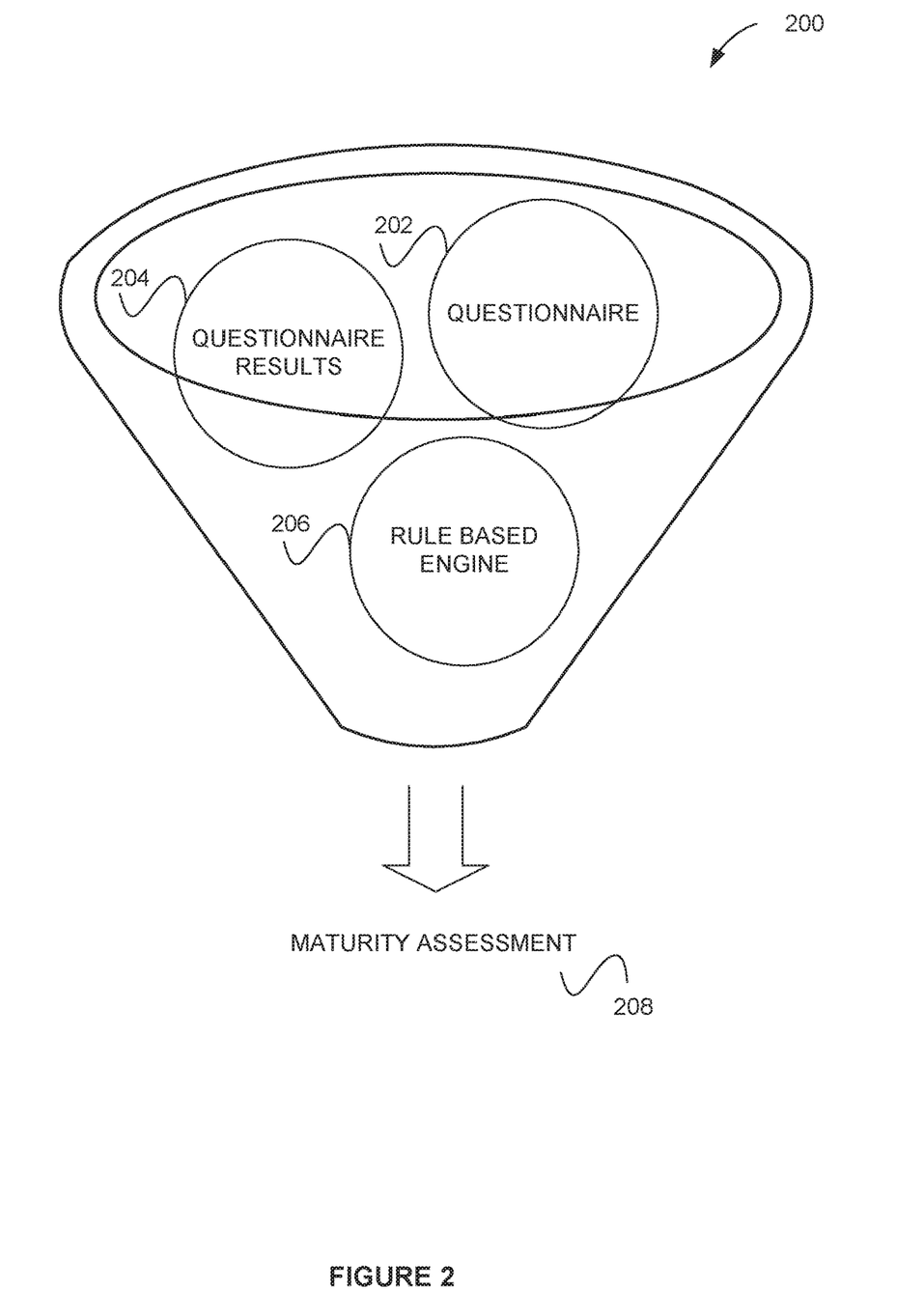
FIG. 2 illustrates a model for generating a maturity assessment of a DMS, in accordance with one embodiment.

FIG. 2 illustrates a model 200 for generating a maturity assessment of a DMS, in accordance with one embodiment. As an option, the model 200 may be implemented in the context of the details of FIG. 1 and/or any subsequent figure(s). Of course, however, the model 200 may be implemented in the context of any desired environment.

As shown, the model 200 involves at least one questionnaire 202. Such at least one questionnaire 202 is further shown to, in turn, produce a plurality of questionnaire results 204. In one embodiment, such questionnaire results 204 may take the form of answers.

The model 200 is further shown to involve a rules-based engine 206 that may be used to process the questionnaire results 204. Such processing may, in turn, result in the generation of a maturity assessment 208, as shown. While not shown, the rules-based engine 206 may further be used for other purposes. For instance, the rules-based engine 206 may further be used in the generation of remedies to remedy any deficiencies found in the maturity assessment 208.

Figure 3:
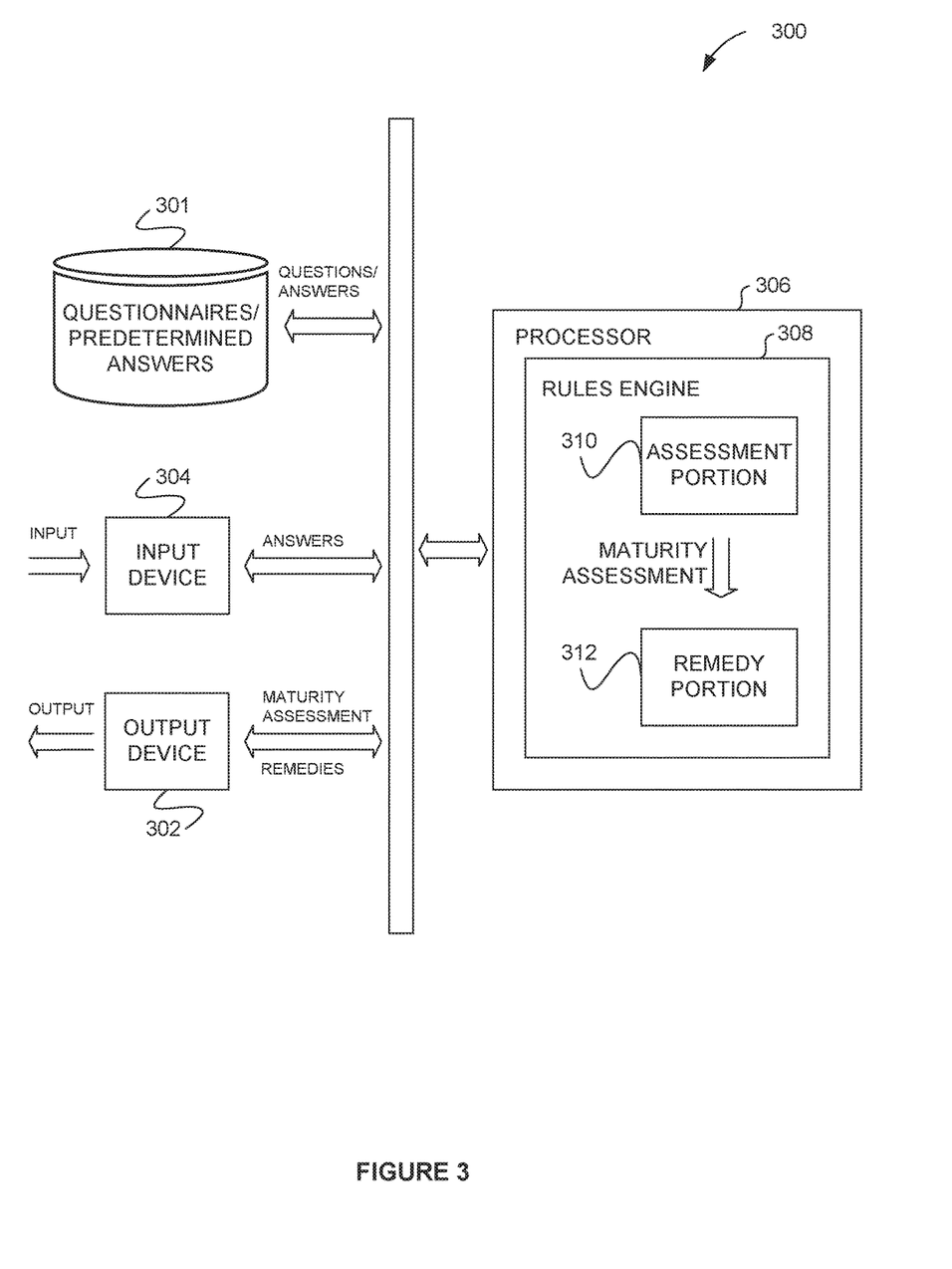
FIG. 3 illustrates a system for generating a maturity assessment of a DMS, in accordance with one embodiment.

FIG. 3 illustrates a system 300 for generating a maturity assessment of a DMS, in accordance with one embodiment. As an option, the system 300 may be implemented in the context of the details of any previous and/or subsequent figure(s). Of course, however, the system 300 may be implemented in the context of any desired environment.

As shown, the system 300 includes a database 301, an output device 302, an input device 304, and a processor 306 that are in communication, as shown. In one embodiment, the aforementioned system components may remain in communication via a bus or the like and, thus, may represent a single computing system. In other embodiments, one or more of the system components may be distributed (e.g. remote, etc.) and thus may remain in communication via one or more networks.

In use, the database 301 of the system 300 serves for storing a plurality of questionnaires that each have multiple questions each with associated predetermined answers. As mentioned earlier, such predetermined answers each include a predetermined level of maturity. The system 300 further includes an input device 304 that is capable of receiving user input. In various embodiments, the input device 304 may include a keyboard, mouse, a touch/voice-sensitive device, machine interface and/or any other type of device capable of receiving input that at least partially originates from a user (e.g. human, artificial intelligence, etc.).

In one embodiment, the input device 304 may receive input in the form of a selection of one or more of the questionnaires to be presented to a user. This may be accomplished, for example by explicitly identifying one or more questionnaires (e.g. via a word search, selection amongst different titles, etc.). In other embodiments, the one or more questionnaires may be presented for selection as a result of an input of one or more groups for which a user is interested in initiating a maturity assessment. It is also contemplated that a single questionnaire may include first questions/answers associated with a first group and second questions/answers associated with a second group, and so forth.

The system 300 is further shown to include an output device 302. In various embodiments, the output device 302 may include a display, printer, communication/network interface, machine interface and/or any other type of device capable of outputting output. In use, the output device 302 may be used to output the questions associated with the selected questionnaire. Further, to the extent that the questions each have predetermined (e.g. multiple-choice) answers associated therewith, such answers may be presented, as well. To this end, the input device 304 may be used to receive a selection of one or more of such answers.

By this design, the answer(s) may be received by the processor 306 for additional processing. As shown, the processor 306 may include a rules engine 308 for processing the answer(s) and generating one or more maturity assessments. Specifically, the rules engine 308 may include an assessment portion 310 for processing the answer(s) to generate the maturity assessment(s), and a remedy portion 312 for receiving/processing the maturity assessment(s) for generating an appropriate one or more remedies.

For example, in one embodiment, the assessment portion 310 of the rules engine 308 may identify, for each group of questions/answers, a numerical value (e.g. weight, etc.) associated with each of the answers received. Further, in one embodiment, such values may be mathematically manipulated (e.g. summed, etc.) to identify an overall level of maturity. In another embodiment where each group of questions/answers has separate sub-groups that relate to different aspects of a particular business channel, the values of each sub-group may be summed and averaged to identify different levels of maturity for each of the different aspects. Further, such different levels of maturity may further be accompanied by various text phrases that textually describe the different levels of maturity. To this end, the overall and/or sub-group levels of maturity may be output via the output device 302 in the form of the levels themselves (e.g. grades, color coding, etc.) and the aforementioned textual descriptions, for instructing a user as to the state of the relevant business channel(s).

Further, some or all of the output of the assessment portion 310 of the rules engine 308 may be fed to the remedy portion 312 of the rules engine 308, as shown. To this end, a corresponding one or more remedies may be identified based on such input. For example, in one possible embodiment, each of the remedies may be correlated with predetermined maturity levels (and/or textual phrases) in a database for look-up purposes. Table 1 below illustrates one example of such a database.

TABLE 1

| Maturity Level_1 | Remedy Options 1A, 1B, 1C |
| Maturity Level_2 | Remedy Options 2A, 2B, 2C |
| Maturity Level_2 | Remedy Options 2A, 2B, 2C |

It should be noted that, while not shown, the database of Table 1 and any other information (e.g. the aforementioned textual phrases, etc.) may be stored in the database 301, or any other database, for that matter.

Figure 4:
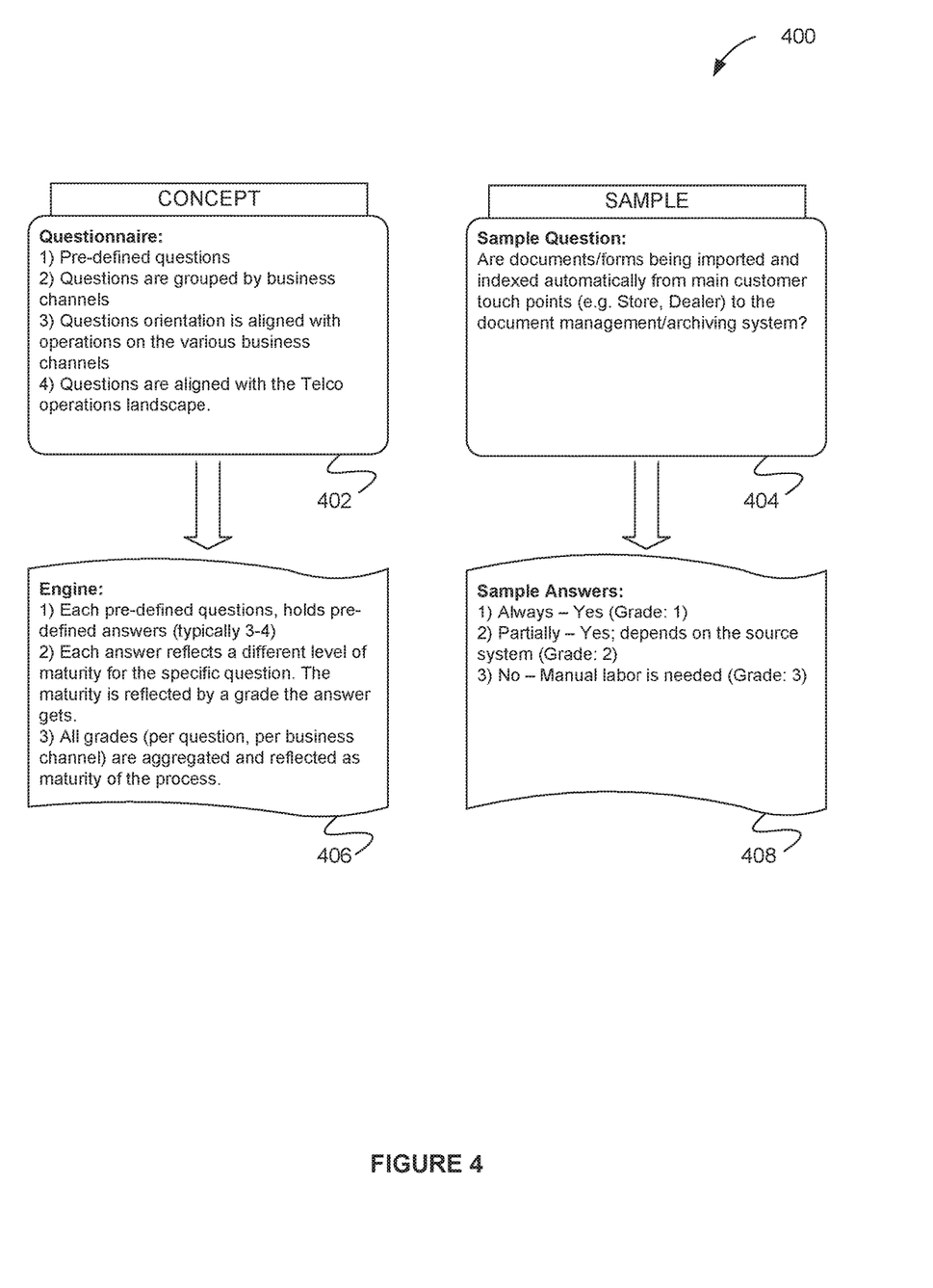
FIG. 4 illustrates a sample algorithm for generating a maturity assessment of a DMS, in accordance with one embodiment.

FIG. 4 illustrates a sample algorithm 400 for generating a maturity assessment of DMS, in accordance with one embodiment. As an option, the algorithm 400 may be implemented in the context of the details of any previous and/or subsequent figure(s). For example, the algorithm 400 may be implemented in the context of the assessment portion 310 of the rules engine 308 of FIG. 3. Of course, however, the algorithm 400 may be implemented in the context of any desired environment.

As shown, a questionnaire 402 may be provided with pre-defined questions that are grouped by business channels. Further, such pre-defined questions may be aligned with (and/or even grouped with) operations of various business channels, and thereby be aligned to a telecommunication operations landscape. Sample questions are shown in item 404. Such questions may thus solicit relevant answers that are fed to an engine 406.

As further illustrated, each pre-defined question has associated therewith pre-defined answers of any desired number (e.g. 3-4, etc.). Further, each answer reflects a different level of maturity for the specific question, where such maturity is reflected by a grade. Still yet, all grades (per question/business channel) may be aggregated and reflect a maturity of the process. Sample answers are shown in item 408.

Figure 5:
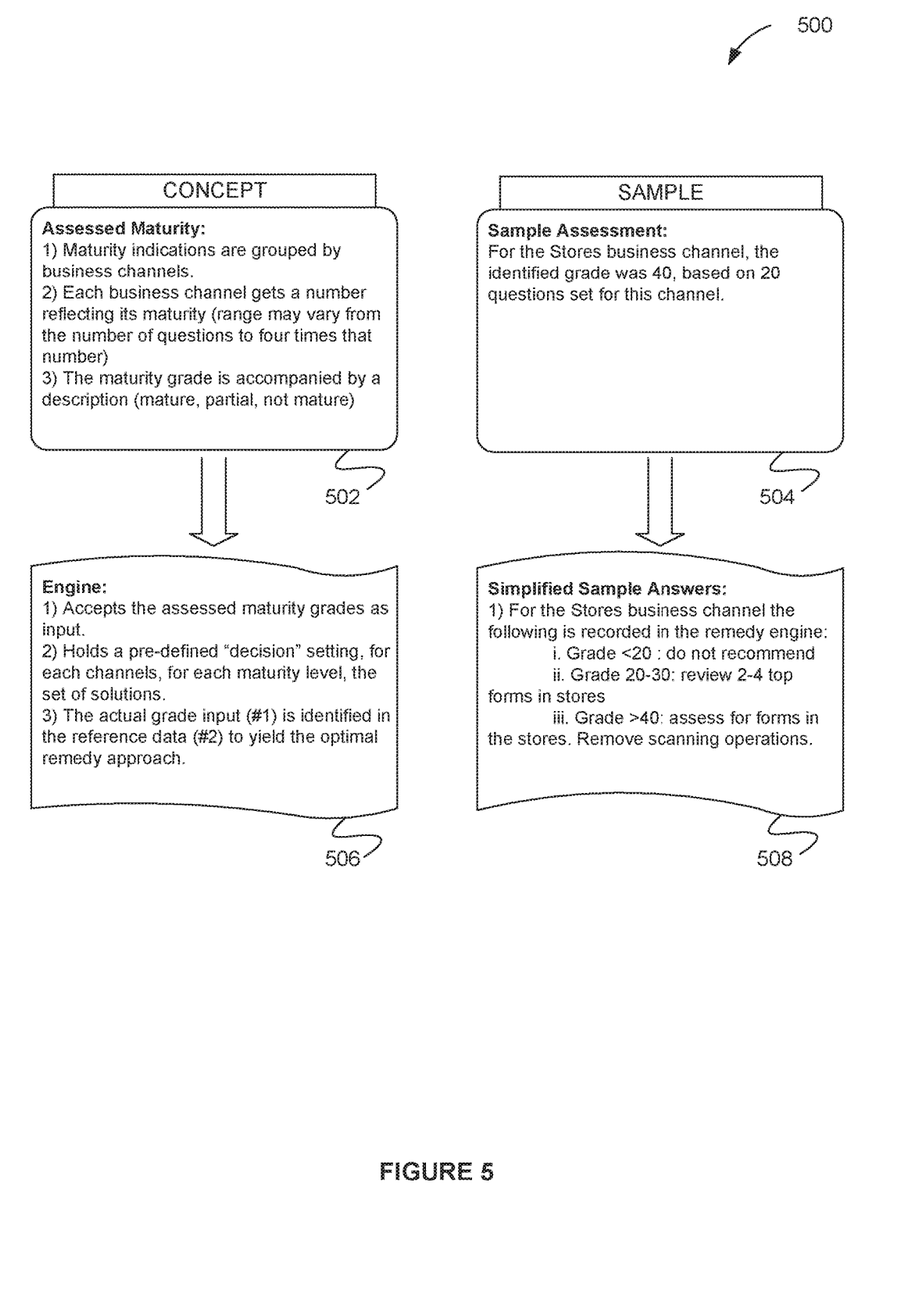
FIG. 5 illustrates a sample algorithm for generating a remedy in connection with a level of maturity, in accordance with one embodiment.

FIG. 5 illustrates a sample algorithm 500 for generating a remedy in connection with a level of maturity, in accordance with one embodiment. As an option, the algorithm 500 may be implemented in the context of the details of any previous and/or subsequent figure(s). For example, the algorithm 500 may be implemented in the context of the remedy portion 312 of the rules engine 308 of FIG. 3. Of course, however, the algorithm 500 may be implemented in the context of any desired environment.

As indicated in item 502, maturity indications may be grouped by business channels. Further, each business channel may be assigned a number reflecting such maturity. In one embodiment, such number may vary from the number of questions to up to four times such number. Further, the maturity grade may be accompanied by a description (e.g. mature, partial, not mature, etc.). A sample assessment is shown in item 504.

As indicated in item 506, the grades of item 502 is received in an engine 506 which holds pre-defined decision settings, for each channel, for each maturity level. To this end, the actual grade input is identified in reference to data, in order to yield an optimal remedy approach. A sample remedy is shown in item 508.

Figure 6:
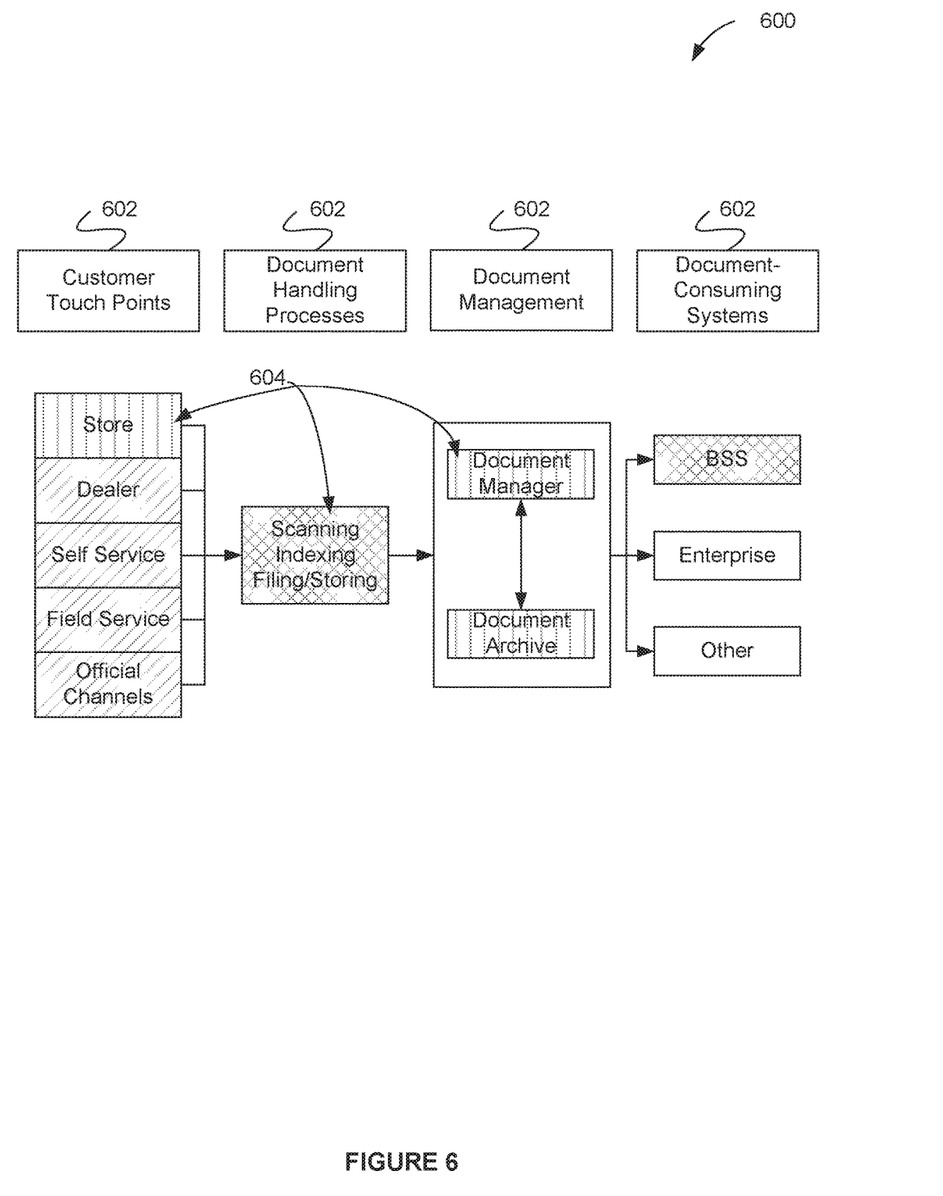
FIG. 6 illustrates a graphical user interface of an environment in which maturity assessment may take place, in accordance with one embodiment.

FIG. 6 illustrates a graphical user interface 600 of an environment in which maturity assessment may take place, in accordance with one embodiment. As an option, the graphical user interface 600 may be implemented in the context of the details of any previous and/or subsequent figure(s). Of course, however, the graphical user interface 600 may be implemented in the context of any desired environment.

As shown, the graphical user interface 600 may illustrate a plurality of business channel sections 602. As shown, such business channel sections 602 may, for example, include a customer touch point section, a document handling process section, a document management section, and a document-consuming systems section. Further, various sub-sections may be provided, as well. For example, the customer touch point section may include store, dealer, self-service, field service, and offline channel sub-sections. Further, the document handling process section may include scanning, indexing, filing, and storing sub-sections. Still yet, the document management section may include document manager, and document archives sub-sections. Even still, the document-consuming systems section may include business support systems (BSS), enterprise and other sub-sections.

As further shown, various sections and/or sub-sections may be color-coded to indicate a level of maturity assigned thereto, based on an analysis of a rules-engine. To this end, a business may assess a maturity of a DMS. By its design, a supportive means is provided for affording a detailed analysis to make the assessment more efficient.

Figure 7:
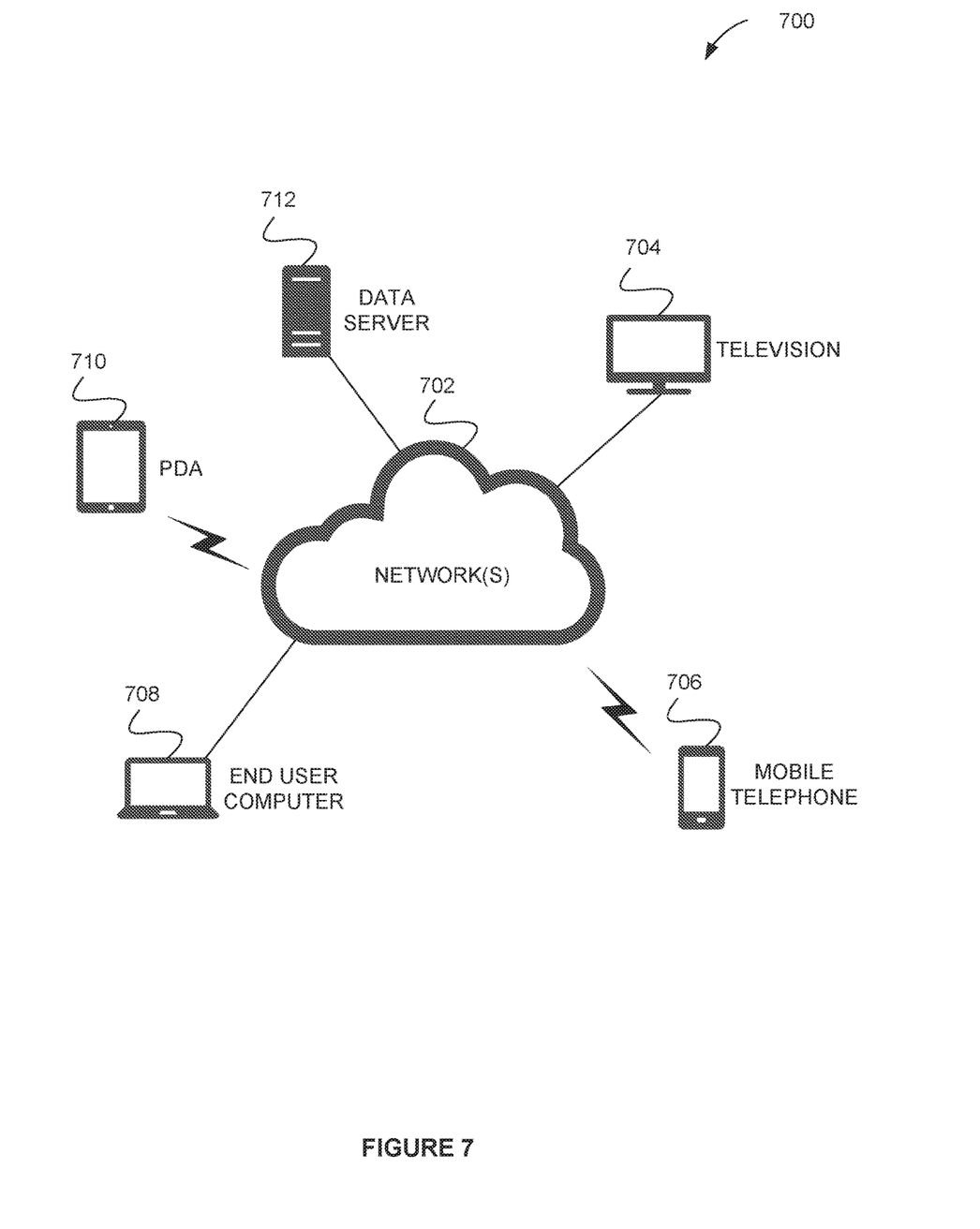
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc. In one possible embodiment, various components of FIG. 7 (e.g. 706, 708, 710, etc.) may be linked to customer touch points as a source of documents to the DMS.

Figure 8:
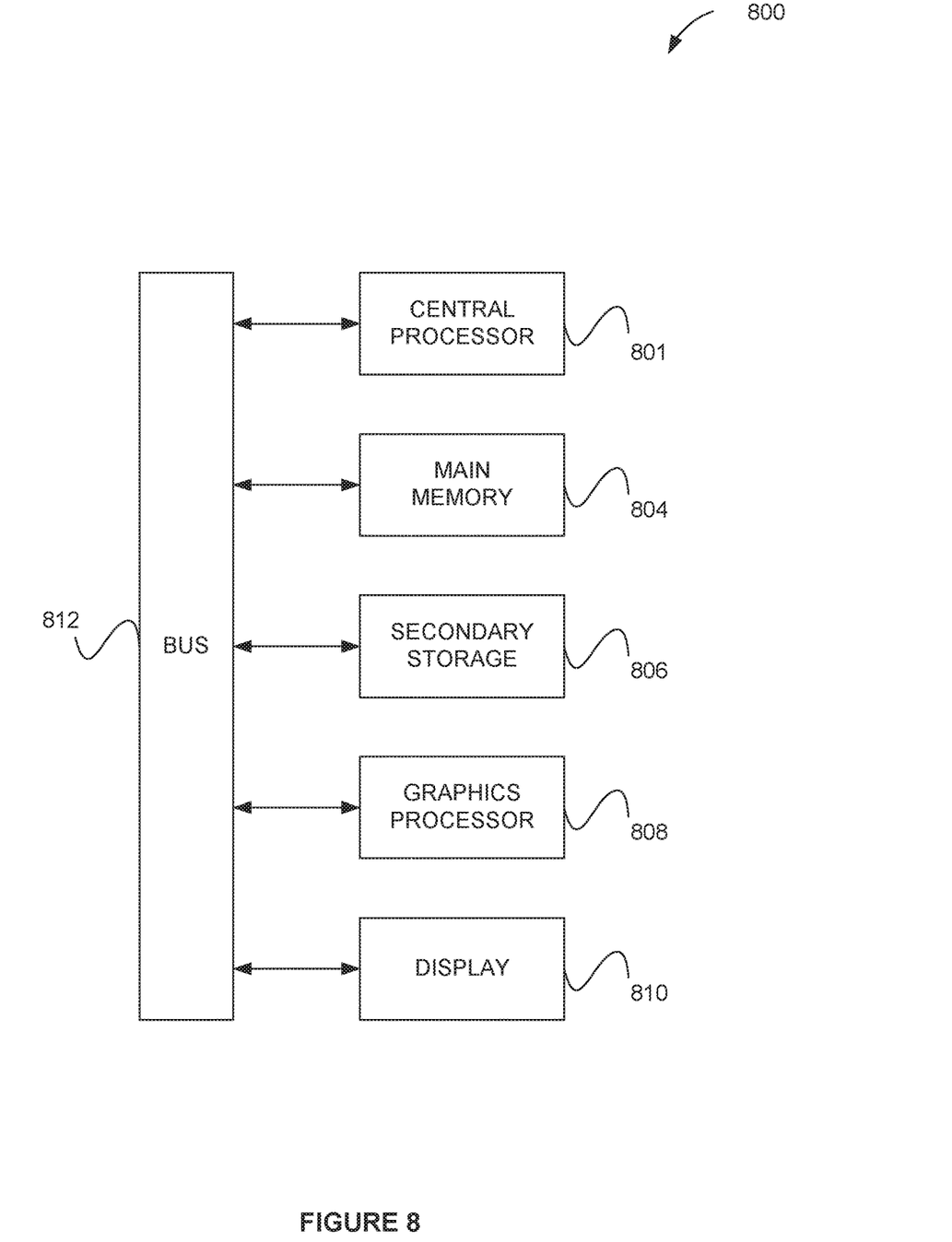
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 812. The system 800 also includes main memory 804 [e.g. random access memory (RAM), etc.]. The system 800 also includes a graphics processor 808 and a display 810.

The system 800 may also include a secondary storage 806. The secondary storage 806 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804, the secondary storage 806, and/or any other memory, for that matter. Such computer programs, when executed, enable the system 800 to perform various functions (as set forth above, for example). Memory 804, storage 806 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:

storing, in a database, a plurality of questionnaires including questions relating to a document management system, the document management system including hardware and software used for managing electronic documents for an entity and the questions being grouped by business channel for the entity;

receiving, via at least one input device, a selection of one or more answers to one or more of the questions, the one or more answers selected from a plurality of predefined answers indicating different levels of completeness of development of the document management system:

processing, utilizing at least one processor, the one or more of answers to the one or more of the questions, for generating a maturity assessment of the document management system that indicates a determined level of completeness of development of the document management system for each of one or more business channels;

outputting, via at least one output device, an indication of the determined level of completeness of development the document management system for each of the one or more business channels; and processing, utilizing the at least one processor, the maturity assessment for identifying one or more technical solutions predefined for improving the level of completeness of development the document management system for each of the one or more business channels, the one or more technical solutions being decision settings providing an optimal remedy for improving the level of completeness of development the document management system for each of the one or more business channels.

2. The computer program product of claim 1, wherein the computer program product is configured such that the maturity assessment relating to the document management system is generated utilizing a rules engine.

3. The computer program product of claim 1, wherein the computer program product is configured such that the maturity assessment relating to the document management system includes color coding.

4. The computer program product of claim 1, wherein the computer program product is configured such that the maturity assessment relating to the document management system includes predetermined text phrases.

5. The computer program product of claim 1, and further comprising aggregating, utilizing the at least one processor, the maturity assessment for each of one or more business channels for generating a single maturity assessment.

6. A method, comprising:

storing, in a database, a plurality of questionnaires including questions relating to a document management system, the document management system including hardware and software used for managing electronic documents for an entity and the questions being grouped by business channel for the entity:

receiving, via at least one input device, a selection of one or more answers to one or more of the questions, the one or more answers selected from a plurality of predefined answers indicating different levels of completeness of development of the document management system;

processing, utilizing at least one processor, the one or more of answers to the one or more of the questions, for generating a maturity assessment of the document management system that indicates a determined level of completeness of development of the document management system for each of one or more business channels;

outputting, via at least one output device, an indication of the determined level of completeness of development the document management system for each of the one or more business channels: and processing, utilizing the at least one processor, the maturity assessment for identifying one or more technical solutions predefined for improving the level of completeness of development the document management system for each of the one or more business channels, the one or more technical solutions being decision settings providing an optimal remedy for improving the level of completeness of development the document management system for each of the one or more business channels.

7. A system, comprising:

a database configured to store a plurality of questionnaires including questions relating to a document management system, the document management system including hardware and software used for managing electronic documents for an entity and the questions being grouped by business channel for the entity;

at least one input device configured to receive a selection of one or more answers to one or more of the questions, the one or more answers selected from a plurality of predefined answers indicating different levels of completeness of development of the document management system:

at least one processor in communication with the at least one input device, the at least one processor configured to process one or more of answers to the one or more of the questions of the questionnaires, for generating a maturity assessment of the document management system that indicates a determined level of completeness of development of the document management system for each of one or more business channels;

at least one output device in communication with the at least one processor, the at least one output device configured to output an indication of the determined level of completeness of development the document management system for each of the one or more business channels; and wherein the at least one processor is further configured to process the maturity assessment for identifying one or more technical solutions predefined for improving the level of completeness of development the document management system for each of the one or more business channels, the one or more technical solutions being decision settings providing an optimal remedy for improving the level of completeness of development the document management system for each of the one or more business channels.

* * * * *